United States Patent [19]

Gasman

[11] Patent Number: 4,615,910

[45] Date of Patent: Oct. 7, 1986

[54] REPLASTICIZATION OF AN ALREADY MANUFACTURED FLEXIBLE VINYL PRODUCT TO PREVENT CRACKING OR TEARING OF SAID PRODUCT

[76] Inventor: Robert C. Gasman, 60 Kitchell Lake Dr., West Milford, N.J. 07480

[21] Appl. No.: 723,434

[22] Filed: Apr. 15, 1985

[51] Int. Cl.$^4$ .............................................. B32B 35/00
[52] U.S. Cl. ................................ 427/140; 427/393.5; 427/429
[58] Field of Search .................... 427/140, 393.5, 444, 427/429

[56] References Cited

U.S. PATENT DOCUMENTS 2,622,038 12/1952 Charlesworth ...................... 427/140
4,131,700 12/1978 Guglielmo ........................... 427/140

FOREIGN PATENT DOCUMENTS 571523 8/1945 United Kingdom ............. 427/393.5

OTHER PUBLICATIONS

Fujimura et al., "Supplemental Plasticization of Polyvinyl Chloride", Plastics Industry News, pp. 49–52, Apr. 1975.

Primary Examiner—Sadie L. Childs
Attorney, Agent, or Firm—Robert C. Gasman

[57] ABSTRACT

A process is described that can be employed in the field for preventing the formation of cracks and tears in already manufactured and fabricated flexible vinyl products from plasticizer loss induced embrittlement involving replasticization by spreading on the vinyl product a uniform coating of a liquid, vinyl plasticizer at temperatures between 4° C. and 60° C. followed by allowing the product to remain undisturbed for up to ten days at temperatures between 4° C. and 60° C. when the plasticizer will have been absorbed into the interior of the vinyl product as evidenced by the surface of the product exhibiting reduced resiliency, and feeling dry and non tacky to the touch.

5 Claims, No Drawings

REPLASTICIZATION OF AN ALREADY MANUFACTURED FLEXIBLE VINYL PRODUCT TO PREVENT CRACKING OR TEARING OF SAID PRODUCT

BACKGROUND OF THE INVENTION

Flexible vinyl sheet, film, and flexible vinyl coated fabric are very versatile materials and find a wide variety of uses. Curtains for windows and showers, coverings for home and office furniture, automotive seat covers, single ply flexible vinyl membranes for covering industrial roofs, wall coverings, shoe uppers, purses and agricultural sheet illustrate the diversity of uses for this material.

Despite its wide utility there are some problems associated with the use of flexible vinyl in many applications. One of the more serious problems involves cracks or tears that develop in a flexible vinyl product after a period of use as the vinyl becomes stiff and brittle with age. These cracks or tears generally mark the end of the useful life of the vinyl.

It is known that loss of plasticizer from flexible vinyl is responsible for this stiffening and embrittlement of the vinyl (P. Dunn, et. at. *J. Appl. Poly. Sci.*, 14, 2107–2116, 1970). The vinyl gradually loses flex fatigue resistance, becomes progressively shiffer, harder, and more brittle with further losses of plasticizer until cracks already develop.

Flexible vinyl film, sheet, coated fabric etc. can lose plasticizer by a variety of mechanisms:

(1) the most common cause of plasticizer loss and subsequent embrittlement of flexible vinyl materials is plasticizer volatilization.

(2) plasticizer loss by rub off represents the second most frequent cause of plasticizer loss.

(3) a less often encountered cause of plasticizer loss is extraction by cooking fats and oils which condense on flexible vinyl coated products located in the food preparation area of the home during cooking.

The number of methods of preventing plasticizer loss that have been proposed reflect the substantial economic implications of the problem. For example, it has been proposed to plasticize polyvinyl chloride with materials having molecular weights that are sufficiently high that plasticizer loss due to volatilization would be negligible. Such high molecular weight non volatile materials are generally not as efficient plasticizers for polyvinyl chloride resin as the low molecular weight more volatile plasticizers. Impermeable coatings for the surface of flexible vinyl film, sheet, and coated fabric have been proposed that would prevent loss by inhibiting plasticizer migration to the surface and subsequent evaporation from the surface of the flexible vinyl product.

Although all of the foregoing techniques for preventing plasticizer loss are effective to some degree they are not universally employed by manufacturers in the highly cost competitive flexible vinyl industry owing to their expense. All of the foregoing methods for preventing crack or tear development in flexible vinyls owing to plasticizer loss are designed to be implemented at the time the flexible vinyl product is being manufactured. For example, it is well known that plasticizers can be incorporated in vinyl plastic at the time when the vinyl plastic compound is being manufactured. Conditions which must be met in order to incorporate vinyl plasticizers in vinyl products at the time of manufacture according to the Plastics Engineering Handbook include temperatures of 300° to 350° F. in order to fuse the vinyl dispersion, high shear, low speed mixing in order to disperse the resin in the plasticizer, and the use of special very fine particle size, high porosity resins known as dispersion grade resins in order to insure that the plasticizer permeates the resin thoroughly.

A need, however, exists for a method of preventing plasticizer loss induced cracking after vinyl products have been manufactured, fabricated, and purchased by the consumer. U.S. Pat. No. 2,622,038 attempts to respond to this need by disclosing a method for preventing deterioration of vinyl plastics by applying plasticizer to the surface of the flexible vinyl plastic and allowing it to be absorbed. Although this method has proven useful it is not without its disadvantages.

When certain U.S. Pat. No. 2,622,038 plasticizers are applied neat to a flexible vinyl surface they do not wet that surface. Failure to wet the surface of vinyl products by these plasticizers leads to blisters, blotchiness, pigment extraction, and surface disfigurements on the surface of the vinyl product once the isolated pools of plasticizer on the product surface have been absorbed. Other U.S. Pat. No. 2,622,038 plasticizers when applied neat require excessively long times for absorption into the surface of a flexible vinyl product. In addition all plasticizers of U.S. Pat. No. 2,622,038 when tested are readily extracted from flexible vinyl products by kerosene, a test which assesses the sensitivity of flexible vinyl plastics to accidental spillage of automotive fluids. The number of plasticizers which are truly satisfactory for replasticization of flexible vinyl plastic products is remarkably small given the large number of plasticizers that are available commercially at this time.

When any plasticizer including U.S. Pat. No. 2,622,038 plasticizers are applied as a solution or dispersion in a diluent which will not attack flexible vinyl plastics such as mineral oil the surface of the vinyl plastic is wetted, but the rate of absorption of the solution or dispersion into the surface of the vinyl plastic is greatly retarded.

SUMMARY OF THE INVENTION

It has been found that the disadvantages of the prior art replasticization methods can be substantially overcome by application of 0.002 to 0.2 lbs. per sq.ft. of flexible vinyl surface of neat plasticizers having room temperature surface tensions below 34 dynes/cm., plasticizer absorption times less than 10 days at 4° C. for plasticizer applications of 0.0088 lbs./sq. ft., and kerosene extraction resistance values less than 10% at 23° C. from 40 mil milled and molded flexible PVC sheet.

OBJECT OF THE INVENTION

It is the object of the present invention to provide an improved method for replasticization of an already manufactured flexible vinyl product.

Another object of the present invention is to provide a method for the replasticization of an already manufactured vinyl product that can easily be employed in the field.

Another object of the present invention is to provide a method having a short treatment time for the replasticization of an already manufactured vinyl product.

Another object of the present invention is to provide a method for the replasticization of an already manufactured, flexible vinyl product which results in a non tacky, non resilient surface.

DESCRIPTION OF THE INVENTION

The method of the present invention contemplates preparation of the vinyl product to be replasticized by first cleaning it with either a solvent or an aqueous detergent solution to remove grease and other soils which might interfere with the wetting of the vinyl product surface by the plasticizer solution. Suitable cleaning solvents are those which will not attack vinyl products and include mineral spirits, hexane, heptane, VM&P naphtha, and the like. Suitable aqueous detergents include any household spray cleaner designated by the manufacturer on the label as suitable for flexible vinyl. Detergent cleaning of vinyl should be followed by a rinse with clear water, followed by a period sufficient to allow thorough drying of the product before application of the replasticization liquid.

The suitable neat liquid vinyl plasticizer is typically applied at levels of 0.002 to 0.2 lbs. per sq. ft. of vinyl surface per application. Multiple applications of the liquid may be required to achieve higher treatment levels. It is critically important that the plasticizer does not come in contact with a shear cut or knife cut edge of the vinyl product. Initially the freshly applied plasticizer remains on the surface but eventually it is absorbed into the interior of the vinyl product so that the initial "wet" and greasy feel from the fresh plasticizer application disappears as the plasticizer is absorbed by the vinyl leaving the vinyl surface feeling non tacky, and dry to the touch. For liquid plasticizers of this invention complete absorption occurs within ten days at temperatures between 4° and 60° C. for plasticizer applications of 0.0088 lbs. per sq. ft. or less.

Suitable liquid plasticizers are limited to those, having 25° C. surface tensions below 34 dynes/cm. so as to insure that the plasticizers will uniformly wet a clean flexible vinyl surface, rates of absorption into flexible vinyl sufficiently high that a plasticizer application of 0.0088 lbs. per sq. ft. is completely taken up within ten days at use temperatures as low as 4° C., and kerosene extraction levels less than 10% at 23° C. for 40 mil milled and molded flexible PVC. Examples of suitable liquid plasiticizers include 2,2,4-trimethyl 1,3-pentanediol diisobutyrate, dibutyl isophthalate, diisobutyl phthalate, the diester of phthalic acid with a commercial mixture Oxo process hexyl alcohol isomers(Jayflex DHP, EXXON chemical), and mixtures of C4 thru C10 dialkyl phthalates and other plasticizers that meet the foregoing surface tension, absorption rate, kerosene extraction resistance, low surface tack, and low resiliency requirements. Solutions or dispersions of plasticizer in non vinyl attacking diluents such as VM&P naphtha, or mineral oil and the like are not suitable for this invention because the presence of such diluents in plasticizer greatly extends absorption time.

Plasticizers may be applied to the vinyl surface to be replasticized with a plasticizer saturated cloth, towel, paint brush, paint roller, sponge, and porous flexible urethane foam applicator for paint. In general any of the application means found useful for low viscosity liquids such as oil based paints, furniture polish, or liquid car wax may be used. Plasticizer should never be placed directly on the vinyl surface but rather should always be applied to the vinyl with an applicator. Pouring the plasticizer directly on the vinyl surface may lead to a surface plasticizer pool which could either raise a blister or extract pigment or coloring from the vinyl surface before the pool can be spread over the entire vinyl surface uniformly. Application of plasticizers by dipping will not provide acceptable results owing to the potential for blistering, or pigment extraction problems mentioned earlier as well as the difficulty in predicting the quantity of plasticizer that will be absorbed for any given immersion period. Dipping vinyl fabric into plasticizer will cause the vinyl coating to separate from the fabric backing if the immersion period is long enough.

EXAMPLES

The following examples serve to further illustrate the invention.

EXAMPLE 1

2,2,4-Trimethyl 1,3-pentanediol diisobutyrate plasticizer, 1 g., was applied with a paint brush to a clean 6 in. × 6 in. rectangle centered within an 8 in. × 8 in. piece of 1.55 lbs./sq. yd. commercial, white, flexible vinyl fabric at room temperature. A uniform application of plasticizer over the vinyl surface was observed indicating that the plasticizer readily wets the vinyl fabric surface. Tack free time or the time for the plasticizer to be completely absorbed by the vinyl fabric at room temperature was 41 hours.

COMPARITIVE EXAMPLE

Prior art plasticizer, tricresyl phosphate, 1 g., was applied to a clean 6 in. × 6 in. rectangle centered within an 8 in. × 8 in. piece of 1.55 lbs./ sq. yd. commercial, white, flexible vinyl fabric at room temperature. The tricresyl phosphate did not wet the surface of the vinyl fabric at all as evidenced by the discrete pools of plasticizer present on the surface of the vinyl fabric at all times after application. The 1 g. of tricresyl phosphate was not absorbed after 30 days at 4° C.

COMPARITIVE EXAMPLE

Prior art plasticizer, dibutyl phthalate, 1 g., was applied to a clean 6 in. × 6 in. rectangle centered within an 8 in. × 8 in. piece of 1.55 lbs./sq. yd. commercial, white, flexible vinyl fabric at room temperature. The dibutyl phthalate did not wet the surface of the vinyl fabric at all as evidenced by the discrete pools of plasticizer present on the surface of the vinyl fabric within a minute or two after application. The 1 g. of dibutyl phthalate was absorbed within twenty-four hours at room temperature.

EXAMPLE 2

Diisobutyl phthalate, 1 g., was applied to a 6 in. × 6 in. rectangle centered within an 8 in. × 8 in. piece of 1.55 lb/sq. yd. commercial, white, flexible vinyl fabric at room temperature. A uniform coating of plasticizer over the vinyl surface was observed indicating the plasticizer readily wet the vinyl fabric. Complete absorption of the plasticizer occurred within 48 hours at room temperature.

COMPARATIVE EXAMPLE

Prior art plasticization compound consisting of tricresyl phosphate in white mineral oil, 50:50 w:w, 1 g., was applied to a 6 in. × 6 in. rectangle centered within an 8 in. × 8 in. piece of 1.55 lbs./sq. yd. commercial, white, flexible vinyl fabric at room temperature. All plasticization compounds and plasticizers in these examples are always applied within a 6 in. × 6 in. rectangle centered within an 8 in.×8 in. piece of fabric so as to provide a 1 in. border all around the area of applied plasticizer which insures that all the plasticizer must be absorbed through the top surface of the fabric and is not absorbed at all through the side edges of the fabric. Although the dispersion of tricresyl phosphate in mineral oil did wet the vinyl fabric surface, absorption of the dispersion into the fabric required 168 hours at room temperature.

While the present invention has been described with respect to application of selected plasticizers having room temperature surface tensions below 34 dynes/cm., absorption times less than ten days at 4° C. for plasticizer applications of 0.0088 lbs./sq. ft., and kerosene extraction resistance levels of less than 10% at 23° C., etc., it will be evident to one skilled in the art that many other plasticizers may be employed in the practice of this invention that also meet the above requirements and therefore the scope of this invention should not be construed to be limited only to just those plasticizers listed above.

The invention having been described, the following is claimed:

1. A process for preventing the formation of cracks and tears in already manufactured and fabricated flexible vinyl products from plasticizer loss caused embrittlement, which process comprises replasticizing the flexible vinyl products by applying to the surface of the flexible vinyl product at between 4° C. and 60° C. a uniform coating of a liquid plasticizer having:
    (a) a room temperature (25° C.) surface tension less than 34 dynes/cm.; and
    (b) an absorption time at 4° C. of less than 10 days for an application of 0.0088 lbs./sq. ft. of plasticizer to flexible vinyl fabric; and
    (c) and a kerosene extraction value of less than 10% at 23° C. from 40 mil milled and molded flexible PVC; and by subsequently allowing the product to remain undisturbed for up to 10 days at between 4° C. and 60° C. until the plasticizer has been absorbed into the interior of the vinyl as evidenced by the surface of the vinyl feeling dry, and non tacky to the touch.

2. A process of claim 1 where the liquid plasticizer is 2,2,4-trimethyl-1,3-pentanediol diisobutyrate.

3. A process of claim 1 where the liquid plasticizer is a diester of phthalic acid with with a mixture of Oxo process hexyl alcohol isomers.

4. A process of claim 1 where the liquid plasticizer is diisobutyl phthalate.

5. A process of claim 1 where the liquid plasticizer is dibutyl isophthalate.

* * * * *